(12) United States Patent
Ueyama et al.

(10) Patent No.: US 11,442,981 B2
(45) Date of Patent: Sep. 13, 2022

(54) INFORMATION PROVIDING DEVICE, INFORMATION PROVIDING METHOD, AND RECORDING MEDIUM WITH COMBINED IMAGES CORRESPONDING TO SELECTED GENRE

(71) Applicant: Honda Motor Co., Ltd., Tokyo (JP)

(72) Inventors: Masaki Ueyama, Saitama (JP); Tomoyuki Sahata, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 331 days.

(21) Appl. No.: 16/358,721

(22) Filed: Mar. 20, 2019

(65) Prior Publication Data
US 2019/0303397 A1    Oct. 3, 2019

(30) Foreign Application Priority Data

Mar. 30, 2018 (JP) .............................. JP2018-069549

(51) Int. Cl.
*G06F 16/54* (2019.01)
*G06F 16/55* (2019.01)

(52) U.S. Cl.
CPC .............. *G06F 16/54* (2019.01); *G06F 16/55* (2019.01)

(58) Field of Classification Search
CPC .... G06F 16/538; G06F 16/5866; G06F 16/55; G06F 16/54; G06N 20/00
See application file for complete search history.

(56) References Cited

U.S. PATENT DOCUMENTS

| 6,366,956 | B1 * | 4/2002 | Krishnan | ................ H04L 43/00 707/999.004 |
| 2010/0245868 | A1 * | 9/2010 | Wade | ...................... G06T 11/60 358/1.9 |
| 2011/0320423 | A1 * | 12/2011 | Gemmell | ............ G06F 16/9535 707/706 |
| 2013/0204866 | A1 * | 8/2013 | Fork | ..................... G06F 16/532 707/723 |
| 2018/0373719 | A1 * | 12/2018 | Valliani | ............. G06F 16/24578 |

FOREIGN PATENT DOCUMENTS

| JP | 2003167917 | 6/2003 |
| JP | 2015161892 | 9/2015 |
| JP | 2017016296 | 1/2017 |

OTHER PUBLICATIONS

"Office Action of Japan Counterpart Application," with machine English translation thereof, dated Jan. 14, 2020, p. 1-p. 10.

* cited by examiner

*Primary Examiner* — Marc S Somers
(74) *Attorney, Agent, or Firm* — JCIPRNET (57) ABSTRACT

An information providing device, an information providing method, and a program capable of assisting in creating user's inspiration and improving efficiency in creating inspiration are provided. The information providing device is an information providing device displaying first data extracted from a first data group and second data extracted from a second data group in combination, and includes: a first memory unit storing a data group classified under a genre as the first data group; and a second memory unit storing a data group related to the genre of the first data group as the second data group.

7 Claims, 8 Drawing Sheets

FIG. 1

| Genre | First data group ||
|---|---|---|
| | Text information | Image |
| Winter sports | Skiing | Image A1 |
| | Skating | Image B1 |
| | Curling | Image C1 |
| | ... | ... |

FIG. 2

| Genre | Second data group ||
|---|---|---|
| | Text information | Image |
| Winter sports | Hot spring | Image D1 |
| | Mountaineering | Image E1 |
| | Driving | Image F1 |
| | ... | ... |

| Genre | First data group ||
|---|---|---|
| | First word | Image |
| Winter sports | Skiing | Image A1 |
| | Skating | Image B1 |
| | Curling | Image C1 |
| | ... | ... |

FIG. 7

| Genre | Second data group ||
|---|---|---|
| | Second word | Image |
| Winter sports | Hot spring | Image D1 |
| | Mountaineering | Image E1 |
| | Driving | Image F1 |
| | ... | ... |

INFORMATION PROVIDING DEVICE, INFORMATION PROVIDING METHOD, AND RECORDING MEDIUM WITH COMBINED IMAGES CORRESPONDING TO SELECTED GENRE

CROSS-REFERENCE TO RELATED APPLICATION

This application claims the priority benefit of Japan Application No. 2018-069549, filed on Mar. 30, 2018. The entirety of the above-mentioned patent application is hereby incorporated by reference herein and made a part of this specification.

BACKGROUND

Technical Field

The disclosure relates to an information providing device, an information providing method, and a recording medium.

Related Art

Inventors have proposed an idea generation assistance device capable of inspiring a user's idea and leading to a new idea by combining a first word input by the user with a randomly extracted second word and providing the combination to the user in order to recall inspiration (e.g., see Japanese Patent Application No. 2017-157611). Upon recalling inspiration, it is expected that efficient ideas will come out.

In addition, there is known a technique of extracting characteristics relating to a learner's learning based on a result of answers to a test or the like. In a general school's teaching style, a lecturer grasps students' degree of comprehension and so on by a desk patrol around the students. However, in this form, the number of students that one lecturer can check at a time is limited, and it is difficult to accurately and promptly grasp each student's degree of comprehension and so on. Hence, it has been proposed (e.g., see Japanese Laid-open No. 2015-161892 (Patent Document 1)) that in the case where a student has entered an answer to a question in an answer column with an electronic pen system, an analyzer determines the degree of comprehension of the student who entered the answer or a degree of difficulty of the question based on entry information showing the student's handwriting. In the technique described in Patent Document 1, a track from a pen-down in which an electronic pen contacts the answer column until a pen-up in which the electronic pen leaves the answer column is detected as stroke information. In the technique described in Patent Document 1, based on this stroke information, number of strokes per question, answer time, stroke length, area of an entry area within an answer sheet, writing pressure, distance between strokes, direction of entry, distribution of strokes and so on are recognized. Furthermore, in the technique described in Patent Document 1, based on the recognized information, the student's state, such as whether the student is concentrating, stumbling, inspired, or whether group work is going well, is detected. Moreover, in the technique described in Patent Document 1, in the case where a rate of increase in the number of strokes per unit time exceeds a predetermined value, it is determined that the student has an inspiration.

However, with the technique described in Patent Document 1, it is only detecting whether there was an inspiration based on the stroke of the electronic pen, and it is impossible to assist in creating user's inspiration.

The disclosure provides an information providing device, an information providing method, and a program, capable of assisting in creating user's inspiration and improving efficiency in creating inspiration.

SUMMARY (1) An information providing device (1, 1A) according to an aspect of the disclosure is an information providing device displaying first data extracted from a first data group and second data extracted from a second data group in combination and includes: a first memory unit (101) storing a data group classified under a genre as the first data group; and a second memory unit (103) storing a data group related to the genre of the first data group as the second data group.

(2) An information providing method according to an aspect of the disclosure is an information providing method in an information providing device. The information providing device has a first memory unit storing a data group classified under a genre as a first data group and a second memory unit storing a data group related to the genre of the first data group as a second data group. The information providing method includes: a step in which a first extraction unit extracts first data from the first data group; a step in which a second extraction unit extracts second data from the second data group; and a step in which a combination unit displays the first data and the second data in combination.

(3) A non-transitory recording medium according to an aspect of the disclosure stores a program for a computer of an information providing device. The information providing device has a first memory unit storing a data group classified under a genre as a first data group and a second memory unit storing a data group related to the genre of the first data group as a second data group. The program causes the computer to execute: a step of extracting first data from the first data group; a step of extracting second data from the second data group; and a step of displaying the first data and the second data in combination.

DESCRIPTION OF THE EMBODIMENTS (4) In the information providing device according to an aspect of the disclosure, the first data group may be preset.

(5) In the information providing device according to an aspect of the disclosure, the second data group may be set by a system user.

(6) In the information providing device according to an aspect of the disclosure, data of the first data group may be an image, and data of the second data group may be an image.

(7) The information providing device according to an aspect of the disclosure may include a processing unit (106) performing image processing on and displaying at least one of the image of the first data and the image of the second data in combination.

(8) The information providing device according to an aspect of the disclosure may include a processing unit using artificial intelligence to perform image processing on and display the image of the first data and the image of the second data in combination.

According to the above (1), (2) or (3), since the first data and the second data of a genre corresponding to the first data can be provided, it is possible to assist in creating user's inspiration and improve efficiency in creating inspiration.

According to the above (4) or (5), the user can save their time and effort to preset the first data.

According to the above (6), the image being the first data and the image being the second data can be provided in combination.

According to the above (7) or (8), at least one of the image being the first data and the image being the second data can be processed and provided in combination.

Hereinafter, embodiments of the disclosure are explained with reference to the drawings.

First Embodiment

Figure 1:
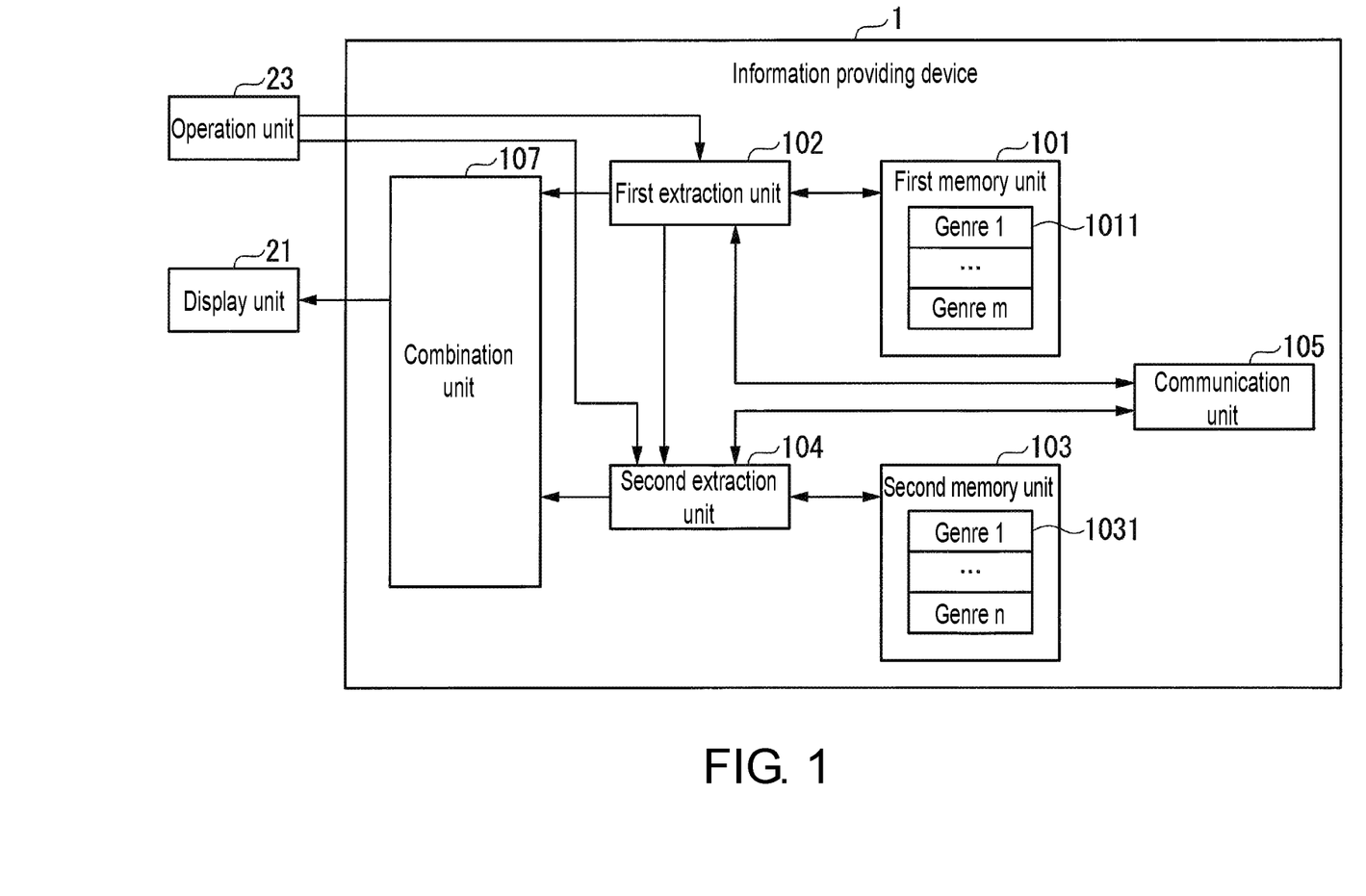
FIG. 1 is a block view showing a configuration example of an information providing device according to a first embodiment.

FIG. 1 illustrates a configuration example of an information providing device 1 according to the present embodiment. As shown in FIG. 1, the information providing device 1 includes a first memory unit 101, a first extraction unit 102, a second memory unit 103, a second extraction unit 104, a communication unit 105, and a combination unit 107.

A display unit 21 and an operation unit 23 are connected to the information providing device 1.

The display unit 21 is a liquid crystal display device, an organic electroluminescence (EL) display device, an electronic ink display device, or the like. The display unit 21 displays an image output by the combination unit 107.

The operation unit 23 is a keyboard, a mouse, a tablet, a touch panel sensor, or the like. The operation unit 23 detects an operation result of a user's operation, and outputs the detected operation result to the first extraction unit 102. The operation unit 23 may be connected to the information providing device 1 via a wireless network. In this case, the operation unit 23 may be a tablet terminal, a smartphone or the like. The user operates the operation unit 23 to input a word of a first data group.

The first memory unit 101 stores the first data group comprising genres and images corresponding to the genres. Herein, a genre stored in the first memory unit 101 is, for example, a discussion theme. Also, the genre is type of a discussion theme. The first memory unit 101 may pre-store the first data group. That is, the first memory unit 101 stores a data group classified under a genre in the first data group. The information stored in the first memory unit 101 will be described later. The information stored in the first memory unit 101 may be placed on a cloud. In addition, in the case where the first memory unit 101 stores a plurality of genres, the first memory unit 101 may store each genre in association with an order or priority order of discussion, or date and time when the discussion is conducted and so on. The images may be still images, moving images, illustrations or animations.

Based on the detection result output by the operation unit 23, the first extraction unit 102 extracts one image corresponding to the genre, as a first image (first data), from the first data group stored in the first memory unit 101, and outputs the extracted first image to the combination unit 107. In addition, the first extraction unit 102 outputs information indicating the genre to the second extraction unit 104.

Alternatively, the first extraction unit 102 may acquire the image (first image) corresponding to the genre based on, for example, a search result obtained by searching on the Internet using an image search engine via the communication unit 105. The first extraction unit 102 may, for example, acquire at least one image on the top of the search result. The first extraction unit 102 may associate the acquired image with an acquired word of the first data group and store it in the first memory unit 101.

The first image corresponding to a first word may be prepared by the user and stored in the first memory unit 101.

The second memory unit 103 stores a second data group comprising second images corresponding to genres. The second memory unit 103 classifies the second images by genre as shown by a sign 1031 and stores the second images. In the case of a plurality of genres, the second memory unit 103 stores the second data group for each genre. The second memory unit 103 may pre-store the second data group. That is, the second memory unit 103 stores a data group related to the genre of the first data group in the second data group. The information stored in the second memory unit 103 will be described later. The information stored in the second memory unit 103 may be placed on a cloud.

The second extraction unit 104 acquires the information indicating the genre that is output by the first extraction unit 102. The second extraction unit 104 extracts one image as a second image (second data) from the second data group corresponding to the genre from among the second data group stored in the second memory unit 103, and outputs the extracted second image to the combination unit 107.

The second extraction unit 104 may search, for example, the Internet, via the communication unit 105, for at least one second image corresponding to the acquired information indicating the genre to acquire the second image.

The communication unit 105 is a wireless communication unit or a wired communication unit. According to an instruction from the first extraction unit 102, the communication unit 105 acquires an image obtained by searching for the genre using the image search engine and outputs the acquired image to the first extraction unit 102. According to an instruction from the second extraction unit 104, the communication unit 105 acquires an image obtained by searching for the genre using the image search engine and outputs the acquired image to the second extraction unit 104.

The combination unit 107 outputs the first image output by the first extraction unit 102 and the second image output by the second extraction unit 104 to the display unit 21. The image displayed on the display unit 21 does not include text information of the first image and text information of the second image. The text information of an image refers to an image name or text information for identifying the image.

Next, an example of the information stored in the first memory unit 101 is explained.

Figure 2:
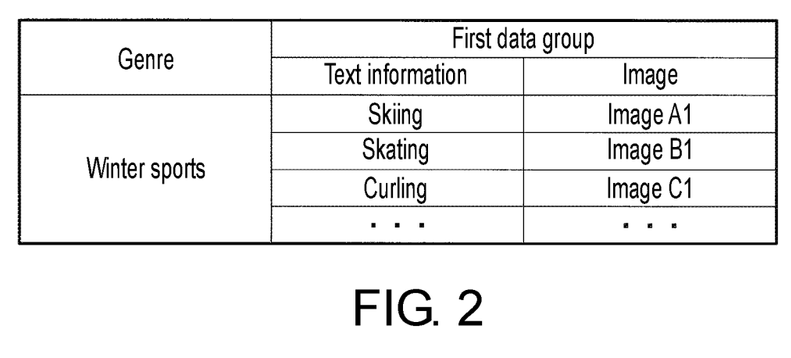
FIG. 2 illustrates an example of information stored in a first memory unit according to the first embodiment.

FIG. 2 illustrates an example of the information stored in the first memory unit 101 according to the present embodiment.

As shown in FIG. 2, the first memory unit 101 stores the first data group in association with a genre. In the example shown in FIG. 2, the genre is "winter sports", and the first data group includes an image of "skiing", an image of "skating", an image of "curling" and so on. Moreover, there may be at least one first image for each genre. In addition, the first memory unit 101 stores an image C1 in association with the first image "curling". There may be a plurality of images corresponding to the first image. In addition, the first memory unit 101 may store the text information of the image name or the text information for identifying the image in association with the image.

Next, an example of the information stored in the second memory unit 103 is explained.

Figure 3:
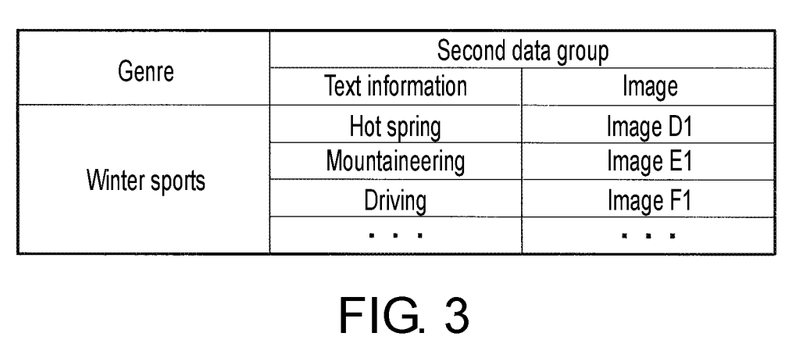
FIG. 3 illustrates an example of information stored in a second memory unit according to the first embodiment.

FIG. 3 illustrates an example of the information stored in the second memory unit 103 according to the present embodiment.

As shown in FIG. 3, the second memory unit 103 stores the second data group in association with each genre. In the example shown in FIG. 3, the genre is "winter sports", and the second data group includes an image of "hot spring", an image of "mountaineering", an image of "driving" and so on. Moreover, there may be at least one second image for each genre. In addition, the second memory unit 103 stores an image D1 in association with the second image "hot spring". There may be a plurality of images corresponding to the second image. In addition, the second memory unit 103 may store the text information as the image name or the text information for identifying the image in association with the image.

Next, an outline of a procedure for using the information providing device 1 is explained.

Figure 4:
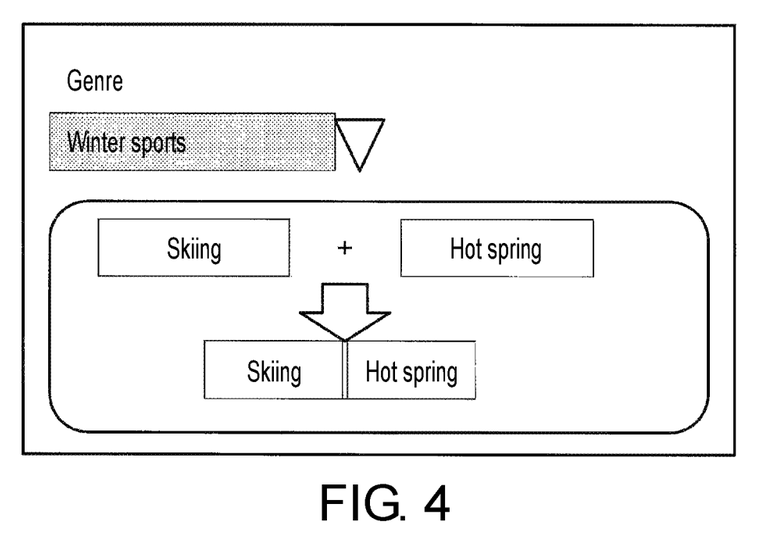
FIG. 4 is a diagram for explaining an outline of a procedure for using the information providing device according to the first embodiment.

FIG. 4 is a diagram for explaining the outline of the procedure for using the information providing device 1 according to the present embodiment.

(i) Step 1: The user operates the operation unit 23 to select the genre "winter sports". For example, the information providing device 1 may display a genre pre-stored in the first memory unit 101 on the display unit 21. The user may select the genre from the genre displayed or may operate the operation unit 23 to input the genre.

(ii) Step 2: The first extraction unit 102 extracts one image as the first image from the first data group corresponding to the selected genre in the information stored in the first memory unit 101.

In the example shown in FIG. 4, the first extraction unit 102 extracts an "image A1" of skiing (see FIG. 2).

(iii) Step 3: The second extraction unit 104 extracts one image as the second image from the second data group corresponding to the selected genre in the information stored in the second memory unit 103. In the example shown in FIG. 4, the second extraction unit 104 extracts an "image D1" of hot spring (see FIG. 3).

(iv) Step 4: The combination unit 107 displays the "image A1" of skiing and the "image D1" of hot spring, for example, in a side-by-side manner as one image on the display unit 21. The combination unit 107 may not display the text information even if the text information is associated with the image.

Figure 5:
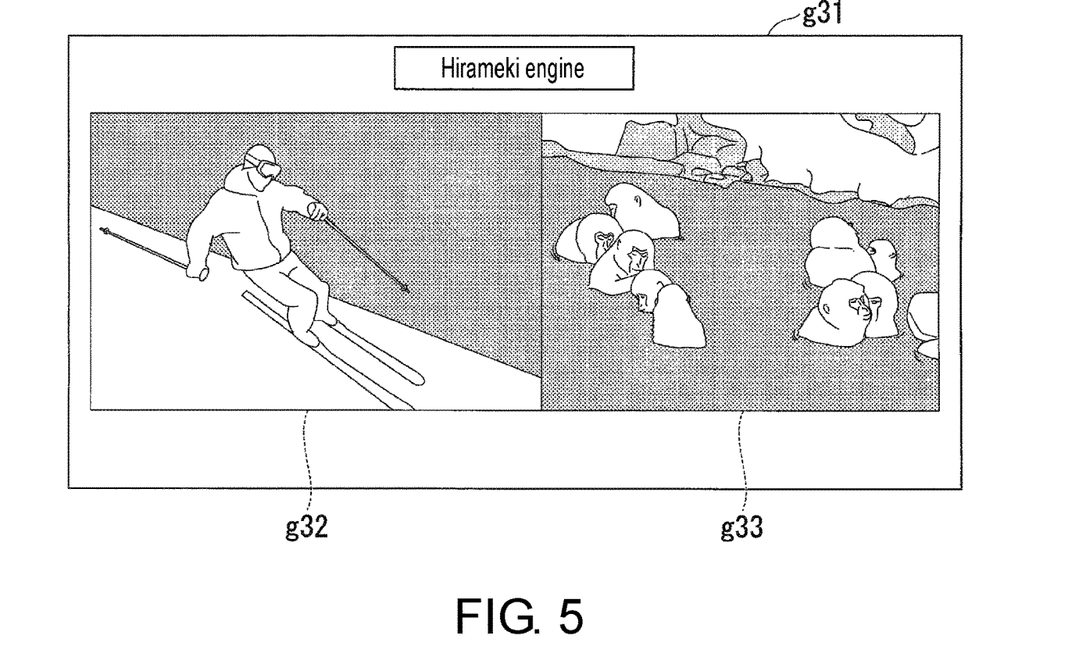
FIG. 5 is an example of a first image and a second image provided by the information providing device according to the first embodiment.

FIG. 5 is an example of the first image and the second image provided by the information providing device 1 according to the present embodiment. An image g31 is an image displayed on the display unit 21. An image g32 is the first image. An image g33 is the second image. Moreover, the combination unit 107 may display the images side by side horizontally as in FIG. 5 or may display the images side by side vertically, wherein the left and right images may be swapped with each other, and the upper and lower images may be swapped with each other. In addition, the combination unit 107 may perform the swapping of display positions and so on after the images are displayed.

The user reviews a word recalled from the two images presented in this way.

Next, an example of a processing procedure performed by the information providing device 1 is explained.

Figure 6:
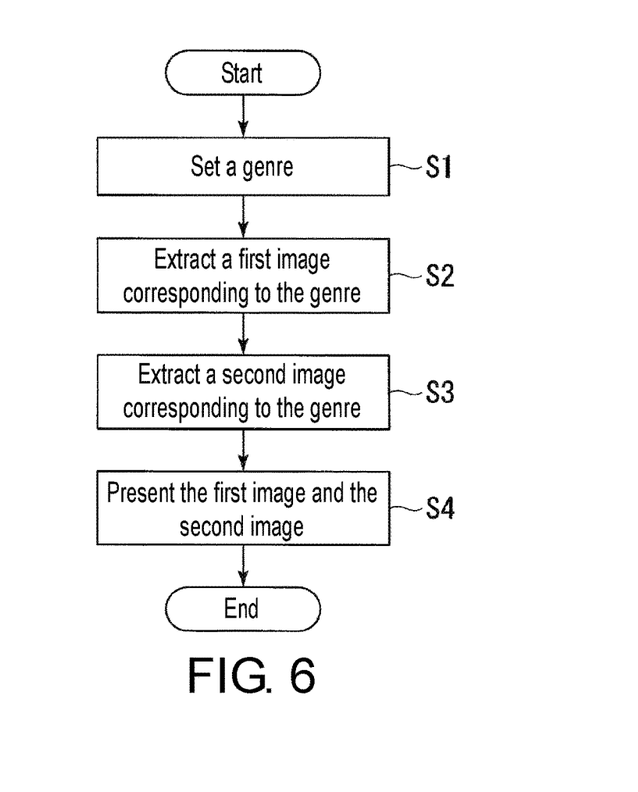
FIG. 6 is a flowchart showing an example of a processing procedure performed by the information providing device according to the first embodiment.

FIG. 6 is a flowchart showing an example of a processing procedure performed by the information providing device 1 according to the present embodiment.

(Step S1) The first extraction unit 102 sets a genre based on an operation result of the operation unit 23.

(Step S2) The first extraction unit 102 extracts a first image corresponding to the genre from the first memory unit 101.

(Step S3) The second extraction unit 104 extracts a second image corresponding to the genre from the second memory unit 103.

(Step S4) The combination unit 107 presents the first image and the second image on the display unit 21.

<Modification>

An example has been explained in which the first extraction unit 102 extracts and provides the first image and the second image based on the genre selected by the user. However, the disclosure is not limited thereto.

When "winter sports" is selected as "genre" by the user, the first extraction unit 102 may extract "skiing" as the first word from the first data group.

Figure 7:
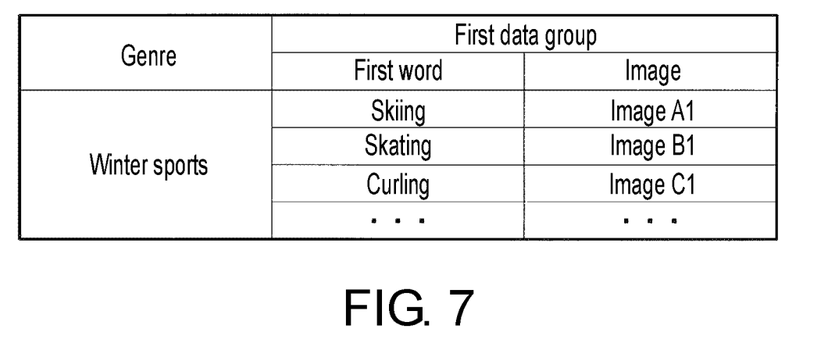
FIG. 7 illustrates an example of the information stored in the first memory unit according to the first embodiment based on a first word.

In this case, the first memory unit 101 may store the first word and the first image corresponding to the first word as the first data group for each genre. FIG. 7 illustrates an example of the information stored in the first memory unit 101 according to the present embodiment based on the first word. As shown in FIG. 7, the first memory unit 101 stores the first data group in association with a genre. In the example shown in FIG. 7, the genre is "winter sports", and the first data group includes the first words and images. For example, the first word is text information of "skiing", and an image associated with the first word is the image A1 of "skiing".

Figure 8:
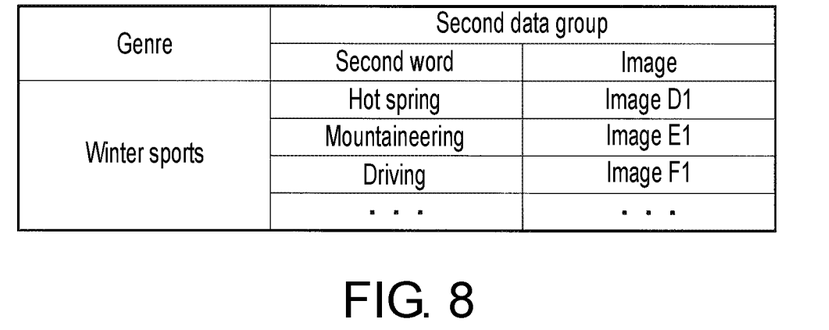
FIG. 8 illustrates an example of the information stored in the second memory unit according to the first embodiment based on a second word.

In this case, the second memory unit 103 may store the second word and the second image corresponding to the second word as the second data group for each genre. FIG. 8 illustrates an example of the information stored in the second memory unit 103 according to the present embodiment based on the second word. As shown in FIG. 8, the second memory unit 103 stores the second data group in association with a genre. In the example shown in FIG. 8, the genre is "winter sports", and the second data group includes the second words and images. For example, the second word is text information of "hot spring", and an image associated with the second word is the image D1 of "hot spring".

Figure 9:
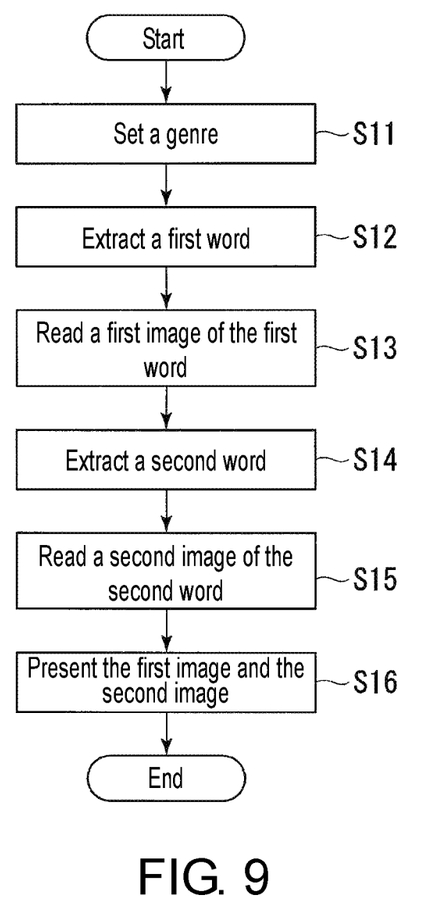
FIG. 9 is a flowchart showing an example of a processing procedure performed by an information providing device in a modification of the first embodiment.

FIG. 9 is a flowchart showing an example of a processing procedure performed by the information providing device 1 in a modification of the present embodiment.

(Step S11) The first extraction unit 102 sets a genre based on an operation result of the operation unit 23.

(Step S12) Based on the set genre, the first extraction unit 102 extracts one word as the first word from the first data group stored in the first memory unit 101. Subsequently, the first extraction unit 102 outputs the extracted first word to the second extraction unit 104. The first word may be selected or set by the user operating the operation unit 23.

(Step S13) The first extraction unit 102 reads a first image corresponding to the extracted first word from the first memory unit 101.

(Step S14) Based on the first word, the second extraction unit 104 extracts one word from the second data group stored in the second memory unit 103 as the second word.

(Step S15) The second extraction unit 104 reads a second image corresponding to the extracted second word from the second memory unit 103.

(Step S16) The combination unit 107 presents the first image and the second image on the display unit 21.

As described above, in the present embodiment, the first image and the second image may be extracted and presented based on the genre selected by the user. Alternatively, in the present embodiment, in the genre selected by the user, the first word is extracted, and the first image corresponding to the first word is extracted. Then, in the present embodiment, the second word is extracted based on the first word and the second image corresponding to the second word is extracted. Further, in the present embodiment, the first image and the second image extracted in this way may be extracted and presented.

A word recalled from the two images presented by the present embodiment in this way can be reviewed. As a result, according to the present embodiment, it is possible to assist in creating user's inspiration and improve efficiency in creating inspiration.

Second Embodiment

In the first embodiment, an example of displaying the first image stored in the first memory unit 101 and the second image stored in the second memory unit 103 has been explained. However, the disclosure is not limited thereto.

Figure 10:
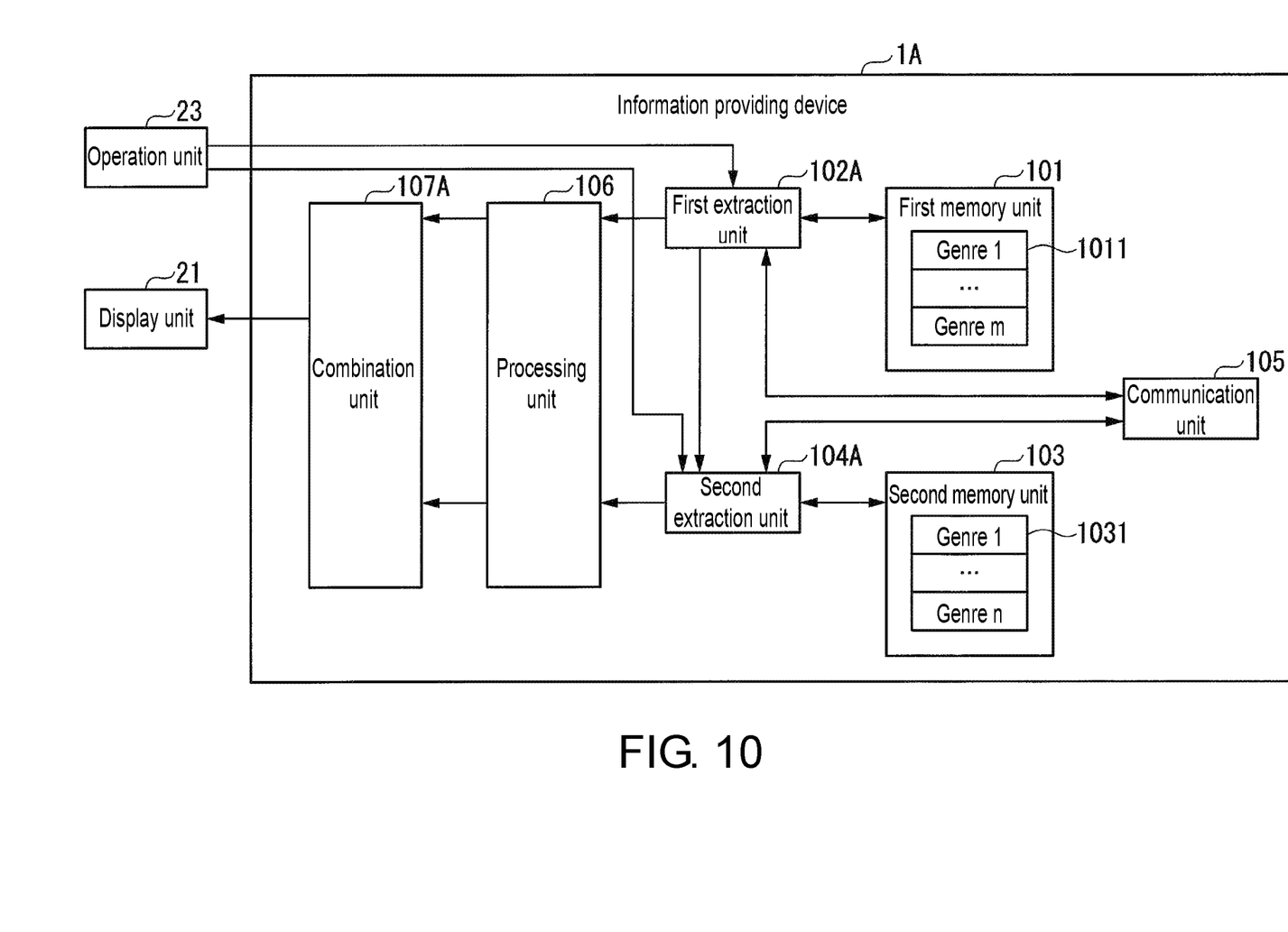
FIG. 10 illustrates a configuration example of an information providing device according to a second embodiment.

FIG. 10 illustrates a configuration example of an information providing device 1A according to the present embodiment. As shown in FIG. 10, the information providing device 1A includes the first memory unit 101, a first extraction unit 102A, the second memory unit 103, a second extraction unit 104A, the communication unit 105, a combination unit 107A, and a processing unit 106.

The display unit 21 and the operation unit 23 are connected to the information providing device 1A. Functional parts performing the same operations as those of the information providing device 1 are denoted by the same reference numerals, and explanation thereof is omitted.

Based on the detection result output by the operation unit 23, the first extraction unit 102A extracts an image of one genre, as the first image, from the first data group stored in the first memory unit 101, and outputs the extracted first image to the processing unit 106. In addition, the first extraction unit 102A outputs information indicating the genre to the second extraction unit 104A.

The second extraction unit 104A acquires the information indicating the genre that is output by the first extraction unit 102A. The second extraction unit 104A extracts one image corresponding to the genre, as the second image, from the second data group stored in the second memory unit 103, and outputs the extracted second image to the processing unit 106.

The processing unit 106 acquires the first image output by the first extraction unit 102A. Moreover, the first image may include text information (see FIG. 2). The processing unit 106 recognizes the first image using a well-known image recognition method (binarization, feature extraction, contour extraction, pattern matching, etc.). In addition, the processing unit 106 acquires the second image output by the second extraction unit 104A. Moreover, the second image may include text information (see FIG. 3). The processing unit 106 recognizes the second image using a well-known image recognition method. Based on an image recognition result, the processing unit 106 discriminates whether or not it is necessary to process the first image and the second image. When it is discriminated that it is necessary to process the images, the processing unit 106 processes the first image and the second image, and outputs the processed first and second images to the combination unit 107A. The processing unit 106, for example, uses an artificial intelligence engine learned using an image learning model to perform the discrimination of whether or not to process and the processing with respect to the first image and the second image. In addition, the processing unit 106 performs the processing considering that the first image and the second image are synthesized using the artificial intelligence engine. The image processing refers to reduction, enlargement, rotation, reversal of images, image deformation, image cropping, and change of emphasis, tone, brightness, saturation and so on. Also, as described later, in the case where an object of an image is food, for example, making an image of the food in a cut state, minced state or grated state is also referred to as image processing in the present embodiment. In this case, the image used for processing may be pre-stored in the first memory unit 101 or the second memory unit 103, or may be acquired by the processing unit 106 via the communication unit 105. For example, in the case where the processing unit 106 determines that processing is to be performed and if the processing is cutting a melon, text information of a "cut melon" may be searched using a search engine to acquire a processed image or an image for processing. The processing unit 106, for example, determines whether or not the image obtained by searching is suitable for a desired image (e.g., an ingredient to be put in curry rice), based on the result obtained by performing image recognition using the image recognition method.

The combination unit 107A synthesizes the first image and the second image output by the processing unit 106 and outputs a synthesized image to the display unit 21. The image synthesis may also be performed by the processing unit 106.

Figure 11:
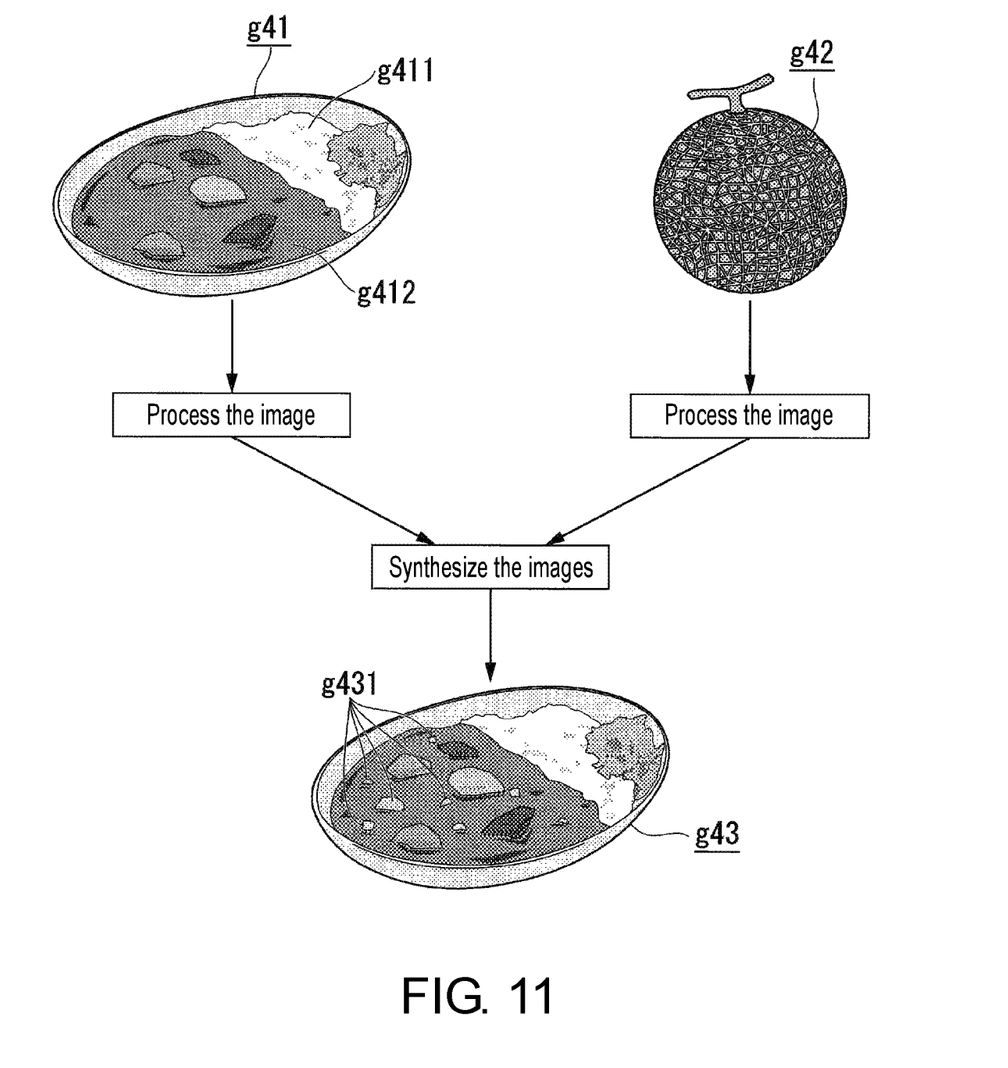
FIG. 11 illustrates an example of the first image and the second image according to the second embodiment, and a processed and synthesized image.

FIG. 11 illustrates an example of the first image and the second image according to the present embodiment, and a processed and synthesized image.

An image g41 is the first image and is an image of "curry rice". In addition, a sign g411 indicates an area of a rice image; a sign g412 indicates an area of a curry image. An image g42 is the second image and is an image of "melon". An image g43 is an image of curry rice with melon. In the image g43, an image g431 is an image of cut melon.

In the case of FIG. 11, the processing unit 106 processes the melon image g42, which is the second image, into the image g431 in which the melon has been cut. The image of the cut melon may be stored in the second memory unit 103 or may be acquired from the network via the second extraction unit 104A.

In addition, when superimposing the image g431 of the melon thus cut on the first image, the processing unit 106 obtains a suitable position based on the image recognition result. In FIG. 11, the processing unit 106 determines an area where the image g431 of the cut melon is arranged to be the area g412 of the curry image. Moreover, the processing unit 106 may adjust density or transparency of the image with respect to a position to be synthesized in the first image to which the image g431 of the cut melon is arranged so that no sense of incongruity is felt when the second image (image g431 of the cut melon) is synthesized.

The drawings shown in FIG. 11 and the processing using FIG. 11 are examples, and the disclosure is not limited thereto.

For example, the processing unit 106 may process the first image and superimpose the second image on the processed first image to combine the images. Alternatively, the processing unit 106 may, for example, display the image g431 of the cut melon in combination as a garnish of curry rice. Further, the processing unit 106 may also perform processing such as changing of resolution, enlargement, reduction and color correction on the first image and the second image upon combination.

Next, an example of a processing procedure performed by the information providing device 1A is explained.

Figure 12:
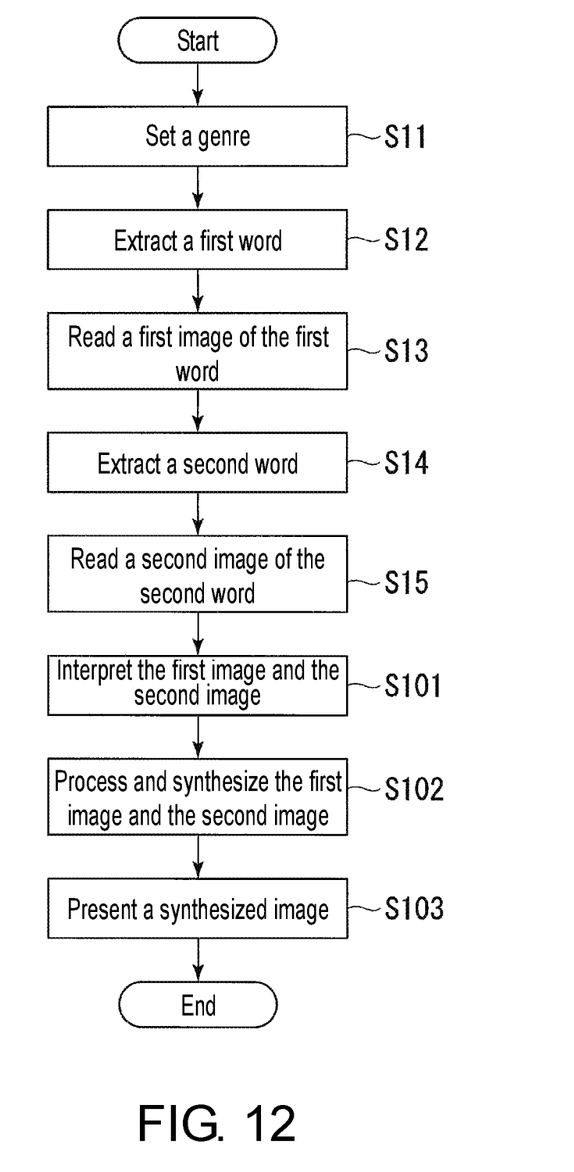
FIG. 12 is a flowchart showing an example of a processing procedure performed by the information providing device according to the second embodiment.

FIG. 12 is a flowchart showing an example of a processing procedure performed by the information providing device 1A according to the present embodiment. Moreover, the following example is a processing example in the case where processing for processing and composing an image is applied in a modification of the first embodiment.

(Steps S11 to S15) The information providing device 1A performs the processing of steps S11 to S15. After the processing, the information providing device 1A proceeds with processing of step S101.

(Step S101) The processing unit 106 interprets the first image and the second image by recognizing the first image and the second image using a well-known image recognition method.

(Step S102) Based on the interpretation result, the processing unit 106 processes the first image and the second image as needed. Subsequently, the combination unit 107A synthesizes the processed images.

(Step S103) The combination unit 107A presents a synthesized image on the display unit 21.

As described above, in the present embodiment, the first image corresponding to the first word and the second image corresponding to the second word are not merely displayed side by side, but are processed and displayed in combination. Accordingly, according to the present embodiment, there is a possibility that the user can recall a word different from that when two images are merely displayed side by side as in the first embodiment.

In the example shown in FIG. 11, an example of displaying a processed image has been explained. However, the disclosure is not limited thereto. Firstly, the information providing device 1A may present the first image before processing and the second image before processing, and present a processed image after conducting the first discussion. In addition, when presenting the processed image, the information providing device 1A may display the processed image using animation so that one image is gradually combined.

In addition, the information providing device 1A may process and combine the first image and the second image based on a word recalled when two images are presented. For example, in FIG. 11, in the case where the recalled word is "melon curry" when curry rice is combined with melon, the information providing device 1A may process the color of the curry into white or blue in accordance with the melon.

The first data group explained in the first and second embodiments may be preset data. In addition, the second data group explained in the first and second embodiments may be data preset by a system user.

In the first and second embodiments, when extracting the second image from the second data group, the information providing device 1 (or 1A) may select the second image randomly, or may select an image having the highest relevance to the first image (or the first word), or may select an image having the lowest relevance to the first image (or the first word).

In addition, in the first embodiment, the information providing device 1 may process and display an extracted image. For example, in FIG. 5, the information providing device 1 may change brightness or contrast or the like of the first image and present the first image in combination with the second image. Alternatively, the information providing device 1 may convert the first image and the second image to grayscale and present them. In some cases, by converting an image to grayscale and presenting the image in this way, it is possible to further assist the user in recalling.

In the first and second embodiments, an image example has been explained as an example of the data presented on the display unit 21. However, the disclosure is not limited thereto. The information providing device 1 (or 1A) may also display text information in addition to images. Moreover, when performing display, the information providing device 1 (or 1A) may display the text information after displaying the image only for a predetermined time, or may display the text information according to operation of the operation unit 23.

The data presented on the display unit 21 may be, for example, acoustic data. For example, in FIG. 5, the first data may be acoustic data of a ski resort or when skiing, and the second data may be acoustic data of hot spring (e.g., sound of flowing hot water) or the like. In this case, the information providing device 1 (or 1A) may continuously reproduce the two pieces of acoustic data or may synthesize and reproduce them.

A program for realizing all or part of the functions of the information providing device 1 (or 1A) in the disclosure may be recorded on a computer-readable recording medium, and all or part of the processing performed by the information providing device 1 (or 1A) may be performed by having a computer system read and execute the program recorded on the recording medium. The "computer system" mentioned here includes an OS or hardware such as peripheral devices. In addition, the "computer system" also includes a WWW system having a homepage providing environment (or display environment). The "computer-readable recording medium" refers to a memory device, such as a portable medium like a flexible disk, a magneto-optical disk, a ROM and a CD-ROM, or a hard disk built in the computer system, and so on. Furthermore, the "computer-readable recording medium" also includes those holding a program for a fixed time, such as a volatile memory (RAM) in the computer system serving as a server or a client in the case where the program is transmitted via a network such as the Internet or a communication line such as a telephone line.

The above program may be transmitted from a computer system in which the program is stored in the memory device or the like to another computer system via a transmission medium or by a transmission wave in the transmission medium. Herein, the "transmission medium" that transmits the program refers to a medium having a function of transmitting information, like a network (communication network) such as the Internet or a communication line such as a telephone line. The above program may be for realizing part of the aforementioned functions. Furthermore, the above program may be a so-called differential file (differential program) capable of realizing the aforementioned functions by combination with a program already recorded in the computer system.

Although the embodiments for carrying out the disclosure have been explained above by way of embodiments, the disclosure is not limited to these embodiments at all, and various modifications and replacements may be made without deviating from the gist of the disclosure.

What is claimed is:

1. An information providing device displaying first data extracted from a first data group and second data extracted from a second data group in combination, comprising:
   a computer system, comprising:
      a display;
      an operation device;
      a first memory device storing each of a plurality of genres in association with a priority order of discussion, or date and time when the discussion is conducted and images corresponding to each of the genres as the first data group, wherein the genre comprises a discussion theme or a type of the discussion theme, and wherein the images corresponding to each of the genres are acquired based on a search result obtained by searching on a network using an image search engine and stored in the first memory unit in association with an acquired word of the first data group; and
      a second memory device storing the second data group classified under the genre of the first data group, wherein data of the second data group is an image,
   wherein the computer system detects the genre selected by a user by the operation device, extracts a first image corresponding to the detected genre from the first data group, and extracts a second image corresponding to the detected genre from the second data group, and
   wherein the computer system synthesizes the first image and the second image to generate a synthesized image and displays the synthesized image on the display after performing image processing on at least one of the first image and the second image.

2. The information providing device according to claim 1, wherein the first data group is preset.

3. The information providing device according to claim 2, wherein the second data group is set by a system user.

4. The information providing device according to claim 1, wherein the second data group is set by a system user.

5. The information providing device according to claim 1, wherein the computer system uses artificial intelligence to perform image processing on the first image of the first data and the second image of the second data and display the processed first image and the processed second image in combination on the display.

6. An information providing method in an information providing device, wherein the information providing device has a computer system comprising a display, an operation device, a first memory device storing each of a plurality of genres in association with a priority order of discussion, or date and time when the discussion is conducted and images corresponding to each of the genres as a first data group and a second memory device storing the second data group classified under the genre of the first data group, wherein data of the second data group is an image, the information providing method comprising:
   a step of acquiring the images corresponding to each of the genres based on a search result obtained by searching on a network using an image search engine and storing the acquired images in the first memory unit in association with an acquired word of the first data group;
   a step of detecting the genre selected by a user by the operation device, wherein the genre comprises a discussion theme or a type of the discussion theme;
   a step of extracting a first image corresponding to the detected genre from the first data group;
   a step of extracting a second image corresponding to the detected genre from the second data group;
   a step of performing image processing on at least one of the first image and the second image; and
   a step of synthesizing the first image and the second image to generate a synthesized image and displaying the synthesized image on the display.

7. A non-transitory recording medium storing a program for a computer system of an information providing device, wherein the computer system comprising a display, an operation device, a first memory device storing each of a plurality of genres in association with a priority order of discussion, or date and time when the discussion is conducted and images corresponding to each of the genres as a first data group and a second memory device storing the second data group classified under the genre of the first data group, wherein data of the second data group is an image, the program causing the computer system to execute:
   a step of acquiring the images correspondingto each of the genres based on a search result obtained by searching on a network using an image search engine and storing the acquired images in the first memory unit in association with an acquired word of the first data group;
   a step of detecting the genre selected by a user by using the operation device, wherein the genre comprises a discussion theme or a type of the discussion theme;
   a step of extracting a first image corresponding to the detected genre from the first data group;
   a step of extracting a second image corresponding to the detected genre from the second data group;
   a step of performing image processing on at least one of the first image and the second image; and
   a step of synthesizing the first image and the second image to generate a synthesized image and displaying the synthesized image on the display.

* * * * *